(12) United States Patent
Gallarda

(10) Patent No.: US 8,355,891 B2
(45) Date of Patent: Jan. 15, 2013

(54) METHOD OF REPLACING THE CATALYST TUBES OF A HYDROCARBON REFORMER

(75) Inventor: Jean Gallarda, Joinville le Pont (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 657 days.

(21) Appl. No.: 12/521,914

(22) PCT Filed: Jan. 9, 2007

(86) PCT No.: PCT/FR2007/050635
§ 371 (c)(1),
(2), (4) Date: Jul. 1, 2009

(87) PCT Pub. No.: WO2008/087306
PCT Pub. Date: Jul. 24, 2008

(65) Prior Publication Data
US 2010/0042370 A1 Feb. 18, 2010

(51) Int. Cl.
*G21C 17/00* (2006.01)
(52) U.S. Cl. ........................................ 702/184
(58) Field of Classification Search ............ 702/99, 702/130, 132, 136, 182–185, 188; 374/129; 134/18; 181/182
See application file for complete search history.

(56) References Cited

U.S. PATENT DOCUMENTS

| 4,187,542 A | | 2/1980 | Ball et al. |
| 4,400,784 A | | 8/1983 | Funk et al. |
| 4,440,510 A | * | 4/1984 | Stein ............................ 374/169 |
| 4,473,490 A | | 9/1984 | Stewart |
| 4,949,578 A | * | 8/1990 | Harpster ....................... 73/202.5 |

FOREIGN PATENT DOCUMENTS

| FR | 2888920 | 1/2007 |
| WO | 0017946 | 3/2000 |

OTHER PUBLICATIONS

Search Report of PCT/FR2007/050635.
Rahimi et al: "CFD Modeling of a Boiler's Tubes Rupture" Applied Thermal Engineering, Pergamon, Oxford, GB, vol. 26, No. 17-18, Dec. 2006, pp. 2192-2200.

* cited by examiner

*Primary Examiner* — Mohamed Charioui
(74) *Attorney, Agent, or Firm* — Elwood L. Haynes; Justin K. Murray

(57) ABSTRACT

A method for the maintenance of a furnace for the catalytic reforming of a hydrocarbon reaction mixture, equipped with tubes filled with catalyst and for which one portion of the tubes is provided with thermocouples, the method comprising a monitoring of the temperature of the tubes is provided.

9 Claims, 1 Drawing Sheet

METHOD OF REPLACING THE CATALYST TUBES OF A HYDROCARBON REFORMER

This application is a §371 of International PCT Application PCT/FR2007/050635 filed Jan. 9, 2007.

FIELD OF THE INVENTION

The present invention relates to a method for the maintenance of a furnace for the catalytic reforming of a hydrocarbon reaction mixture, equipped with tubes filled with catalyst and for which one portion of the tubes is provided with thermocouples, the method comprising a monitoring of the temperature of the tubes.

BACKGROUND

Hydrocarbons are one of the main sources for the manufacture of syngas. The manufacture of syngas consists in converting hydrocarbons $C_nH_m$ to a mixture of at least hydrogen ($H_2$), carbon monoxide (CO) and carbon dioxide ($CO_2$). The gases produced are then used to carry out numerous chemical reactions. Thus, the hydrogen could be used, in particular, for carrying out hydrogenation reactions or, after addition of nitrogen $N_2$, for producing ammonia; a mixture of CO, $CO_2$ and $H_2$ could result in the synthesis of methanol, and mixtures of CO and $H_2$ are the basis for oxo syntheses, etc.

One of the most used methods for achieving this conversion is the catalytic steam reforming of light hydrocarbons, in particular natural gas. In such a method, the mixture of light hydrocarbons, mainly comprising methane, is reacted with steam in the presence of a catalyst to produce hydrogen and carbon oxides. Among the various reactions carried out during the reforming, the main reactions are: the endothermic reforming reaction, namely $CH_4 + H_2O \leftrightarrow CO + 3H_2$, and also the exothermic CO conversion reaction, namely $CO + H_2O \leftrightarrow CO_2 + H_2$. Reforming is overall endothermic and is carried out at a temperature generally in the vicinity of 1000° C. It should be noted that the hydrocarbons are, in general, previously stripped of the sulfur compounds that they contain, the latter being poisons for the catalysts commonly used.

One method for the catalytic steam reforming of light hydrocarbons is carried out in a combustion chamber comprising burners and tubes, the tubes being filled with catalyst and being capable of being passed through by a mixture of hydrocarbons and steam, the burners being arranged so as to transfer the heat from their combustion to the mixture of hydrocarbons and steam through the wall of the tubes.

In practice, the catalytic reforming reaction of hydrocarbons by steam is carried out under pressure over the catalyst contained in the tubes that are heated externally by radiation and convection. The catalyst tubes are positioned vertically and the circulation of the reaction mixture of hydrocarbons and steam is carried out from the top to the bottom.

A reforming furnace comprises a radiation zone, combustion chamber in which the catalyst tubes are placed, and a convection zone, via which the evacuation of the flue gases and of the combustion gases produced in the combustion chamber is carried out. The combustion gases evacuated through the convection zone are used for preheating the incoming reaction mixture of hydrocarbons and steam, and optionally other reaction fluids. The convection zone is generally installed either on top of the combustion chamber, or vertically to the side of the furnace, or horizontally. Depending on the position of the burners in the furnace (at the top for top-fired furnaces, or on the side for side-fired furnaces), the vertical temperature profile of the tube is different. The maximum temperature will especially be achieved at a point of the tube located in around its upper third in the case of a top-fired furnace and around the lower third in the case of a side-fired furnace.

The catalyst tubes used are generally of the centrifugally cast alloy steel tube type. The tube must withstand the high pressures and temperatures used in such a method, while ensuring a good transmission of the heat to the reaction mixture which circulates inside. In addition to having to possess a strength adapted to the very high temperatures, these tubes must be made from a material that also has a very good creep resistance at such temperatures.

The catalyst tubes are subjected to heating/cooling cycles and to very high temperatures; their aging and their integrity must be monitored as accurately and reliably as possible. Specifically, they are calculated for a finite service life (typically 100 000 hours) at a maximum operating temperature DTT (Design Tube Temperature). Exceeding this maximum limit value leads to a significant reduction in the service life of the tubes. For example, constant operation at 20° C. above the operating temperature for which the tubes were designed halves the service life of the tubes, changing it from around ten years to around five years. This problem takes on a most particular importance during start-up phases or phases of changing the composition of the reaction mixture. Monitoring of the temperatures to which the tubes are subjected is therefore essential, but the knowledge of the history of these temperatures is also of crucial significance for the catalytic hydrocarbon reforming method.

Currently, measurements of the temperature of the tubes are carried out discontinuously, in particular by pyrometric measurements. Measurements may also be carried out by using, in particular, thermocouples. Such measurements, whether they are pyrometric or via thermocouples are isolated, both in space and time; they do not make it possible to know all of the temperature differences to which each catalyst tube is subjected throughout its life and over its entire length.

Furthermore, the pyrometric measurements are carried out via peepholes made in the wall of the furnace. When carrying out a measurement, the operator opens the peephole and points the pyrometer (or another measuring instrument) horizontally towards the tube whose wall temperature must be measured; this manipulation tends however to reduce the temperature inside the furnace level with the peephole.

In the case of thermocouple measurements, it should be noted that the thermocouples are an integral part of the catalyst tubes and therefore the temperature measurements do not require intervention by an operator unlike pyrometric measurements. The temperature perturbations caused by an operator opening a peephole are avoided as are the risks incurred by the operator during such a measurement. However, it is not always possible to implant the thermocouple at the location of the tube where the temperature is supposed to be at a maximum since at this location its presence could create a hot spot.

One of the main risks that stems from the absence of reliable and accurate data on the actual temperature of the tubes and the variations undergone is the risk of premature aging leading to the untimely rupture of one or more catalyst tubes in the course of operation and to the shutdown of the plant—outside of predefined maintenance schedules.

In particular, during transient phases such as a restart following a maintenance shutdown or a change in the composition of the reaction mixture, there is a risk of overheating not being detected and corrected immediately; the service life of the catalyst tubes may then be significantly reduced. Consequently, since the risk of overheating cannot be eliminated, it is essential to control the aging of the tubes in order to program the change thereof as soon as it becomes necessary.

Reliable monitoring of the temperatures of each of the tubes is all the more important since the temperatures of the tubes in operation are not the same depending on their position in the furnace, but also as a function of various factors, such as the ignition sequences, the types of hydrocarbons and fuels used, etc.

SUMMARY OF THE INVENTION

The objective of the present invention is to overcome the aforementioned drawbacks by virtue of a method for the maintenance of the furnace, that relies on the determination of the maximum temperature of each tube during the entire life of the furnace, so as to be able to program the changing of the tubes as a function of their aging.

The expression "maximum temperature" is understood to mean the temperature at the hottest point of the tube. Specifically, considering that a reforming tube has a length of several meters and that numerous factors intervene over this length that induce temperature modifications, it is essential to determine the hottest place of the tube, and also the temperature difference that exists between the wall temperature at this point and the temperature(s) effectively determined at the points where the measurements are carried out (or estimated) during the operation of the furnace.

For this, the invention therefore relates to a method for the maintenance of a furnace for the catalytic steam reforming of a hydrocarbon reaction mixture, the furnace comprising tubes filled with catalyst, a first portion of the tubes $T(j)$ being equipped with a thermocouple attached at a point $Y_t(j)$ of said tubes, the other tubes $T(i)$ being free thereof, the method comprising at least the following steps:

1) periodically measuring, for each tube, a temperature $\theta p$ of the wall of the tube using a remote temperature measurement means;
2) continuously measuring and recording, for each of the tubes $T(j)$, a second temperature $\theta t(j)$ of the wall of the tube using a thermocouple attached to said tube and connected to a data acquisition system capable of storing data for a time at least equal to the service life of the furnace, to establish a curve $\theta t(j)$ as a function of the time;
3) for each tube $T(j)$ and for each measurement $\theta p$, calculating $\Delta\theta(j)=\theta p(j)-\theta t(j)$;
4) for each tube $T(i)$ establishing a virtual curve $\theta t(i)_{virtual}$ as a function of the time such that:
   it passes through the $\theta t(i)_{virtual}$ ordinate points $\theta p(i)-\Delta\theta(j)$ for which $\Delta\theta(j)$ is the value calculated during step 3) for a chosen neighboring tube $T(j)$; and
   it corresponds to the translation of the curve $\theta t(j)$ for said neighboring tube $T(j)$, passing through these points;
5) furthermore, for at least one tube, determining the hottest point of the tube and estimating the temperature difference $\Delta\theta_{max}$ between the temperature $\theta_{max}$ at said hottest point and the temperature $\theta t$ measured at the same time under the conditions of step 2);
6) for each tube $T(i)$, establishing a curve $\theta max(i)$ as a function of the time starting from the virtual curve $\theta t(i)_{virtual}$ established in step 4) and from $\Delta\theta_{max}$ from step 5), and for each tube $T(j)$ establishing the curve $\theta_{max}(j)$ starting from the curve established in step 2) and from the estimated $\Delta\theta_{max}$, so as to establish a temperature history for each tube $T(i)$;
7) deducing, in real time, and using a suitable computational method, a remaining service life for each tube $T(i)$, from the curve $\theta_{max}(i)$ and for each tube $T(j)$ from the curve $\theta_{max}(j)$;

8) comparing the remaining service life for each of the tubes with the time remaining before the next programmed shutdowns of the furnace; and
9) replacing the tubes that need replacing during each programmed shutdown.

Thus, the method of the invention enables the user to monitor, as accurately as possible, the actual aging of each tube contained in the reforming furnace and to carry out the replacements of the tubes that require it during the programmed shutdowns of the furnace (having planned the supply of the required number of new tubes).

Specifically, according to step 1 of the above method, the actual temperature $\theta p$ for each of the tubes is measured. This measurement is made at a point of the tube located at an ordinate $Y_p$, which can be accessed via a peephole.

The continuous measurement and recording of the temperature $\theta t$ for some of the tubes, according to step 2 makes it possible to provide an accurate history of the temperature irregularities in the furnace over a long period of time, extending over the service life of the furnace, highlighting and recording the possible temperature overruns. For this, tubes $T(j)$ were equipped with a thermocouple. The thermocouple is preferably attached to a point of the tube located at an ordinate $Y_t(j)$ chosen in the upper ⅓ of the tube relative to the circulation direction of the reaction mixture in the case of a top-fired type reforming furnace. It is preferably attached to a point of the tube located at an ordinate $Y_t(j)$ chosen in the lower ⅓ of the tube relative to the circulation direction of the reaction mixture in the case of a side-fired type reforming furnace.

The acquisition and the recording of the temperature measurements are carried out via a system that allows the management of a large amount of data, their recording in real time, and also their storage and treatment over a time at least equal to the service life of the furnace. The data acquisition system is capable of recording continuous temperature measurements over a period longer than ten years. Since the theoretical service life for which the catalyst tubes are designed is around ten years, such a memory capacity makes it possible to have a complete history of the catalyst tubes.

Thus, two series of temperature measurements, one continuous, the other discrete, were carried out for the portion of the tubes $T(j)$; there are therefore, periodically, two simultaneous temperature measurements obtained by two different means, thus making it possible to calculate the temperature differences $\Delta\theta(j)$ for all of the tubes $T(j)$, and for all of the measurements $\Delta\theta(j)$ (step 3).

Experimentation shows that two neighboring tubes, as long as they identical and they undergo substantially the same perturbations during operation, have comparable temperature differences; likewise, the difference between the temperature measured by a pyrometer and by a thermocouple for a given tube $T(j)$ remains substantially constant between two successive pyrometric measurements; an abnormal variation of this difference measured for a tube $T(j)$ would constitute an anomaly and would call for a verification of the coherence of the measurements.

Step 4 makes it possible, for each tube $T(i)$, to establish a virtual curve representing the temperatures $\theta t(i)_{virtual}$ as a function of the time. For any tube $T(i)$, the choice of the neighboring tube $T(j)$ is not critical as long as the value indicated $\theta t(j)$ is recognized to be reliable. The coherence of the curves thus established can be verified when the measurements $\theta t(i)$ are carried out.

In order to determine, as accurately as possible, the aging of a tube, it is necessary to take into account, for the calculation of this aging, not the temperature $\theta t(i)$ but the maximum temperature reached by the tube. For this purpose, the method comprises step 5 during which, under conditions compatible with the operation of the furnace, the hottest point of a tube is determined, this tube being representative of those for which the aging during operation is evaluated. The difference is calculated between the temperature measured at this point and the temperature measured by a thermocouple in accordance with step 2. It would also be possible to determine the difference via the pyrometric measurement. The determination of the hottest point of a tube is preferably obtained by establishing a temperature profile of the tube over its length; this profile may be provided by the supplier, as an element of the furnace specifications but it could also be the subject of a determination during laboratory tests or on the industrial site in question, be obtained by simulation or in accordance with any other method.

During step 6, all of the curves $\theta_{max}$ as a function of the time are established for the tubes T(i) and T(j) by:

for the tubes T(i), a translation of the curves $\theta t(i)$ virtual of a value equal to the difference corresponding to $\Delta\theta_{max}$ estimated in step 5; and for the tubes T(j), a translation of the curves $\theta t(j)$ for a value corresponding to the difference $\Delta\theta_{max}$ estimated in step 5.

At the end of these steps 1) to 6), the history of the maximum temperature of each of the tubes is thus available for the duration of its life that has already passed.

Such a history of the maximum temperatures for each of the tubes makes it possible to calculate its remaining estimated service life, using a suitable computational method, according to step 7 of the method. This computation is carried out at carefully chosen time intervals so as to recalculate, as often as necessary, this service life as a function of the events undergone by the tubes throughout the use of the furnace. Knowing the remaining service life, the replacement of the tubes that require replacing is programmed (step 8) and carried out (step 9) during a maintenance shutdown.

The method of the invention thus described makes it possible to very substantially reduce the risk of the tubes rupturing during operation, prevents untimely shutdowns of the furnace and the drawbacks that are linked thereto.

Advantageously, the remote temperature measurement means is a pyrometer.

Preferably, the temperature is measured using the remote temperature measurement means at least once a month for all the tubes.

Advantageously, the temperature is measured using the remote temperature measurement means more frequently for the hottest tubes, preferably daily.

This measurement is also preferably carried out during the start of the reforming reaction, in case of a modification of certain parameters, etc.

The peepholes are arranged in the wall of the furnace so that each tube can be sighted from at least one peephole; conventionally, the arrangement of the peepholes is such that it is possible to carry out at least two measurements at different points over the length of a tube. Thus, preferably, at least two temperature measurements will be carried out using the remote temperature measurement means at different points over the length of a tube and the measurement $\theta p$ is the largest of the values measured.

When the reforming furnace is of the side-fired type, for each tube T(j), the thermocouple is preferably attached to a point of the tube located at an ordinate $Y_t(j)$ chosen in the lower ⅓ of the tube relative to the circulation direction of the reaction mixture.

When the reforming furnace is of the top-fired type, for each tube T(j), the thermocouple is preferably attached to a point of the tube located at an ordinate $Y_t(j)$ chosen in the upper ⅓ of the tube relative to the circulation direction of the reaction mixture.

The acquisition and recording of the temperature measurements for the service life of the reforming furnace are advantageously carried out using a SCADA (Supervisory Control And Data Acquisition) type system, the storage capacity of which makes it possible to have a complete history of the catalyst tubes.

Advantageously, the conversion of the relationship $\theta max(i)=f(time)$ for the remaining service life for each of the tubes is carried out using the Larson-Miller relation.

DETAILED DESCRIPTION OF THE INVENTION

Figure 1:
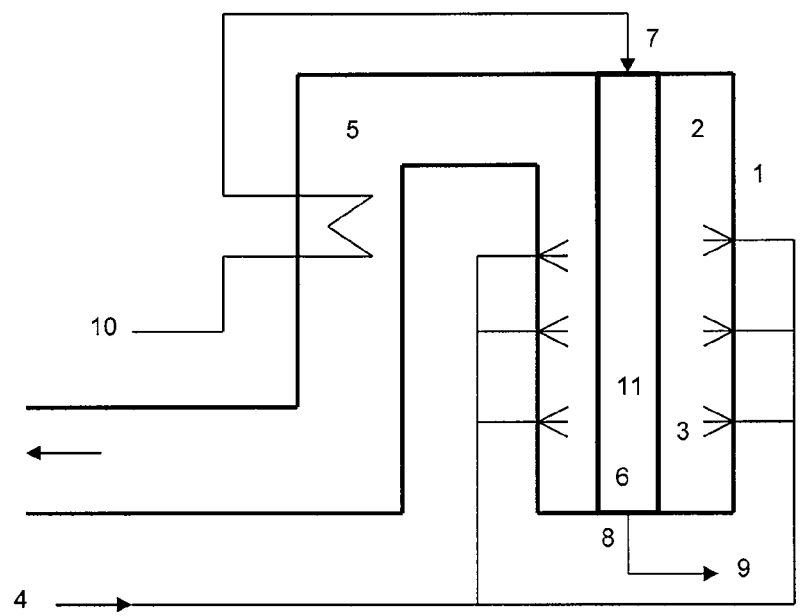
FIG. 1 is a partial schematic representation of a side-fired type furnace for the catalytic reforming of hydrocarbons, suitable for the implementation of the method according to the invention.
Figure 2:
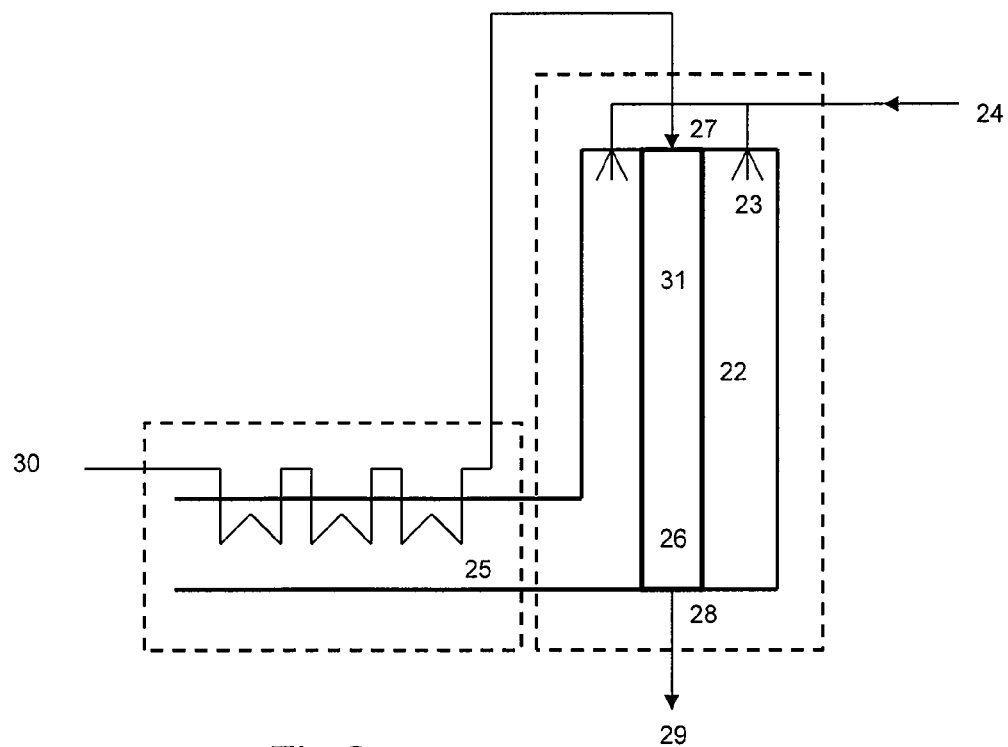
FIG. 2 is a partial schematic representation of a top-fired type furnace for the catalytic reforming of hydrocarbons, suitable for the implementation of the method according to the invention.

The invention will now be described by referring to the attached FIGS. 1 and 2, in which:

FIG. 1 is a partial schematic representation of a side-fired type furnace for the catalytic reforming of hydrocarbons, suitable for the implementation of the method according to the invention; and FIG. 2 is a partial schematic representation of a top-fired type furnace for the catalytic reforming of hydrocarbons, suitable for the implementation of the method according to the invention.

For a further understanding of the nature and objects for the present invention, reference should be made to the detailed description, taken in conjunction with the accompanying drawing, in which like elements are given the same or analogous reference numbers and wherein:

FIG. 1 shows a furnace 1 for the catalytic reforming of hydrocarbons of the side-fired type which may allow the implementation of the method according to the invention. It comprises a combustion chamber 2 equipped with burners 3 positioned along the vertical walls of the furnace and connected to a fuel supply 4 and a convection chamber 5 intended for the evacuation of the gases and flue gases generated by the burners 3.

The burners 3 are arranged so as to form rows, and they heat tubes T(i) and T(j) represented by the tube 6. Filled with catalyst, the tubes 6 are arranged vertically in the combustion chamber 2. Each tube 6 is supplied at its upper end 7 with a reaction mixture 10, and is connected at its lower end 8 to a collector 9 that collects the products of the catalytic reforming reaction.

Before supplying the tube 6, the reaction mixture 10 flows into the convection chamber 5 where it is preheated by the evacuated gases and flue gases.

The tube is part of the tubes T(j), and is equipped with a thermocouple 11 attached underneath the lowest row of burners. The thermocouple is housed in a thermal protection housing, not shown in the figure, in order to protect it from the direct heat of the burners 3. It is connected to an external SCADA system that enables the acquisition, recording and processing of the data in real time (not represented in the figure).

FIG. 2 shows a furnace 21 for the catalytic reforming of hydrocarbons of the top-fired type which may enable the implementation of the method according to the invention. It comprises a combustion chamber 22 equipped with burners 23 positioned on the ceiling of the furnace and connected to a fuel supply 24 and a convection chamber 25 intended for the evacuation of the gases and flue gases generated by the burners 23.

The burners 23 heat tubes T(i) and T(j), represented by the tube 26. Filled with catalyst, the tubes 26 are positioned vertically in the combustion chamber 22. Each tube 26 is supplied at its upper end 27 with a reaction mixture 30, and is connected at its lower end 28 to a collector 29 which collects the products of the catalytic reforming reaction.

Before supplying the tube 26, the reaction mixture 30 flows into the convection chamber 25 where it is preheated by the evacuated gases and flue gases.

The tube is part of the tubes T(j), and is equipped with a thermocouple 31 attached to the upper third of the tube. The thermocouple is housed in a thermal protection housing, not represented in the figure, in order to protect it from the direct heat from the burners 23. It is connected to an external SCADA system that enables the acquisition, recording and processing of the data in real time (not represented in the figure).

The furnaces represented in FIGS. 1 and 2 operate in the same manner for the implementation of the invention.

The tubes T(j) are freely chosen, but are preferably representative of a temperature profile in the furnace, it is also possible to equip each catalyst tube with a thermocouple which is specific to it.

The temperatures $\theta t(j)$ measured by each thermocouple 11, 31 equipping one of the tubes T(j) are transmitted to the SCADA data acquisition and recording system. They are converted to maximum temperature values for each catalyst tube. The maximum temperatures are obtained from corrections applied to the temperatures measured according to the invention.

Thus, the temperature data recorded, supplemented by the periodic pyrometric measurements, provide, in accordance with the method of the invention, all of the $\theta_{max}$ temperature values as a function of the time for all of the tubes of the furnace. From the $\theta_{max}$ temperature data thus recorded, the remaining service life of the tubes 6, 26 is calculated. The calculation of this remaining service life typically uses a relation of the Larson-Miller relation type, a law known and commonly used by a person skilled in the art for forecasting the service life of the tubes. An example of a detailed study on the rupture at temperature and an example of the calculation of the service life as a function of the temperature are presented in the article "*Journal of Corrosion Science and Engineering*, Volume 6, Paper H012", which is available, in particular, from the following addresses: http://www2.umist.ac.uk/corrosion/JCSE/Volume6/Default.html or http://www.jcse.org/.

At time M, any tube has a maximum remaining service life $V_M$, which is specific to it, for a use at the normal operating temperature. This service life $V_M$ is the result of the life prediction calculated using the Larson-Miller relation at said moment M.

During the following calculation, namely at time M+1, the maximum remaining service life $V_{M+1}$ will be determined, according to the invention, using the Larson-Miller temperature parameter, which maximum remaining service life $V_{M+1}$ takes into account the actual operating conditions of the tube since the previous calculation. For this, using the Larson-Miller temperature parameter and from values of $\theta_{max}$ as a function of the time, as a function of the period during which the catalyst tube has remained at the temperature $\theta_{max}$, as a function of the thermal properties of the tube, the equivalent utilization time at the normal operating temperature is calculated for the period of time elapsed since the last calculation at the temperature $\theta_{max}$ (data by SCADA). The estimated remaining service life is then readjusted as a function of this equivalent utilization time. The calculation is carried out for each catalyst tube.

Observation: if the tubes have operated at a temperature below the normal operating temperature, their estimated remaining service life increases; if the tubes have operated at a temperature above the normal operating temperature, their estimated remaining service life decreases.

The calculation of the estimated remaining service life thus provides the plant operator with complementary elements essential in order to schedule, or not, the replacement of all or some of the tubes during a programmed maintenance shutdown.

Although the invention has been described in connection with particular exemplary embodiments, it is obvious that it is in no way limited thereto and that it includes all the technical equivalents of the means described and also their combinations when these fall within the scope of the invention.

Other advantages ensue from the implementation of the monitoring of the temperatures according to the invention, in particular during transient phases such as a restart, a change in the composition of the reaction mixture or any other cause. This tool enables furnace operators to react immediately in case of overheating in the furnace; immediate measurements can be taken to remedy the overheating, the negative impact on the service life of the tubes is thus reduced.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for the maintenance of a furnace for the catalytic steam reforming of a hydrocarbon reaction mixture, the furnace comprising tubes filled with catalyst, a first portion of the tubes T(j) being equipped with a thermocouple attached to a wall of said tube at a point $Y_t(j)$, the other tubes T(i) being free thereof, the method comprising at least the following steps:

1) measuring periodically, for each tube, a temperature $\theta p$ of the wall of the tube using a remote temperature measurement means;
   2) measuring and recording continuously, for each of the tubes T(j), a second temperature $\theta t(j)$ of the wall of the tube using a thermocouple attached to the lower portion of said tubes and connected to a data acquisition system capable of storing data for a time at least equal to the service life of the furnace, to establish a curve $\theta t(j)$ as a function of the time;
   3) calculating $\Delta \theta(j) = \theta p(j) - \theta t(j)$, for each tube T(j) and for each measurement $\theta p(j)$;
   4) establishing a virtual curve $\theta t(i)_{virtual}$, for each tube T(i), as a function of the time such that:

the virtual curve $\theta t(i)_{virtual}$ passes through the ordinate points $\theta p(i)_1 - \Delta\theta(j)$ for which $\Delta\theta(j)$ is the value calculated during step 3) for a chosen neighboring tube $T(j)$; and the virtual curve $\theta T(j)$ results from the translation of the curve for said neighboring tube $T(j)$, passing through the ordinate points $\theta p(i)_1 - \Delta\theta(j)$;

5) determining the hottest point of the tube and estimating the temperature difference $\Delta\theta_{max}$ between the temperature $\theta_{max}$ at said hottest point and the temperature $\theta t$ measured at the same time under the conditions of step 2), for at least one tube;

6) establishing a curve $\theta max(i)$ as a function of the time starting from the virtual curve $\theta t(i)_{virtual}$ established in step 4) and from $\Delta\theta_{max}$ from step 5), for each tube $T(i)$, and for each tube $T(j)$ establishing the curve $\theta_{max}(j)$ starting from the curve established in step 2) and from the estimated $\Delta\theta_{max}$, so as to establish a temperature history for each tube $T(i)$;

7) deducing, in real time, and using the Larson-Miller relation, a remaining service life for each tube $T(i)$, from the curve $\theta_{max}(i)$ and for each tube $T(j)$ from the curve $\theta_{max}(j)$;

8) comparing the remaining service life for each of the tubes with the time remaining before the next programmed shutdowns of the furnace; and 9) replacing the tubes that need replacing during each programmed shutdown.

2. The method of claim 1, wherein the remote temperature measurement means is a pyrometer.

3. The method of claim 1, wherein the temperature is measured using the remote temperature measurement means at least once a month for all the tubes.

4. The method of claim 3, wherein the temperature is measured using the remote temperature measurement means more frequently for the hottest tubes.

5. The method of claim 3, wherein the temperature is measured using the remote temperature measurement means daily.

6. The method of claim 1, wherein at least two temperature measurements are carried out using the remote temperature measurement means at different points over the length of a tube and in that the measurement $\theta p$ is the largest of the values measured.

7. The method of claim 1, wherein, when the reforming furnace is of the side-fired type, for each tube $T(j)$, the thermocouple is attached to a point of the tube located at an ordinate $Y_t(j)$ chosen in the lower ⅓ of the tube relative to the circulation direction of the reaction mixture.

8. The method of claim 1, wherein, when the reforming furnace is of the top-fired type, for each tube $T(j)$, the thermocouple is attached to a point of the tube located at an ordinate $Y_t(j)$ chosen in the upper ⅓ of the tube relative to the circulation direction of the reaction mixture.

9. The method of claim 1, wherein the acquisition and recording of the temperature measurements for the service life of the reforming furnace are carried out using a SCADA type system.

* * * * *